(12) United States Patent
Nobukuni et al.

(10) Patent No.: US 9,698,504 B2
(45) Date of Patent: Jul. 4, 2017

(54) BATTERY TERMINAL

(71) Applicant: Sumitomo Wiring Systems, Ltd., Yokkaichi, Mie (JP)

(72) Inventors: Takashi Nobukuni, Mie (JP); Takashi Tsuchiya, Mie (JP); Takamaru Amano, Mie (JP); Yuichi Nakanishi, Mie (JP)

(73) Assignee: SUMITOMO WIRING SYSTEMS, LTD., Yokkaichi, Mie (JP)

( * ) Notice: Subject to any disclaimer, the term of this patent is extended or adjusted under 35 U.S.C. 154(b) by 0 days.

(21) Appl. No.: 15/306,185

(22) PCT Filed: Apr. 27, 2015

(86) PCT No.: PCT/JP2015/062654
§ 371 (c)(1),
(2) Date: Oct. 24, 2016

(87) PCT Pub. No.: WO2015/174261
PCT Pub. Date: Nov. 19, 2015

(65) Prior Publication Data
US 2017/0047670 A1 Feb. 16, 2017

(30) Foreign Application Priority Data

May 14, 2014 (JP) ................. 2014-100617

(51) Int. Cl.
*H01R 4/42* (2006.01)
*H01R 11/28* (2006.01)
*H01M 2/30* (2006.01)
(52) U.S. Cl.
CPC .......... *H01R 11/283* (2013.01); *H01M 2/305* (2013.01); *H01M 2220/20* (2013.01)

(58) Field of Classification Search
CPC .. H01R 11/283; H01M 2/305; H01M 2220/20
(Continued)

(56) References Cited

U.S. PATENT DOCUMENTS

2005/0064285 A1    3/2005 Fujii et al.

FOREIGN PATENT DOCUMENTS

JP    2002184387 A    6/2002
JP    2005-93393       4/2005
(Continued)

OTHER PUBLICATIONS

International Search Report of Jun. 9, 2015.
European Search Report Dated Jan. 17, 2016.

*Primary Examiner* — Khiem Nguyen
(74) *Attorney, Agent, or Firm* — Gerald E. Hespos; Michael J. Porco; Matthew T. Hespos

(57) ABSTRACT

A battery terminal 1 includes a terminal main body 2 including an upper plate portion 10 and a lower plate portion 60 provided separately from the upper plate portion 10, the upper plate portion 10 including a upper plate mounting portion 20 having an upper plate mounting hole 21 through which a battery post 140 is to be inserted and an upper plate fastening portion 30 connected to the upper plate mounting portion 20, the lower plate portion 60 including a lower plate mounting portion 70 having a lower plate mounting hole 71 through which the battery post 140 is to be inserted and a lower plate fastening portion 80 connected to the lower plate mounting portion 70, and a bracket 100 configured to deform the upper plate mounting hole 21 and the lower plate mounting hole 71 to reduce them in diameter by being mounted on the terminal main body 2.

6 Claims, 20 Drawing Sheets

(58) Field of Classification Search
USPC .................................................. 439/761–769
See application file for complete search history.

(56) References Cited

FOREIGN PATENT DOCUMENTS

| | | |
|---|---|---|
| JP | 2006-286576 | 10/2006 |
| JP | 2006-318751 | 11/2006 |
| JP | 4033285 | 11/2007 |

BATTERY TERMINAL

FIELD OF THE INVENTION

The present invention relates to a battery terminal.

DESCRIPTION OF THE RELATED ART

A battery terminal is a member to be mounted on a battery post of a battery provided in a vehicle. A battery terminal manufactured by press-working one metal plate is disclosed in Publication of Japanese Patent No. 4033285 and includes a terminal main body, a fastener and a bolt and a nut for fastening the fastener to the terminal main body. The terminal main body is formed by bending one metal plate and includes an upper part and a lower part arranged parallel to each other. The upper part includes an annular electrode fitting portion having a cut and two fastening portions respectively extending from both sides of the cut of this electrode fitting portion. Similarly, the lower part also includes an electrode fitting portion and two fastening portions. The fastener includes an upper surface part to be fastened and fixed to the upper part using the bolt and the nut and two side parts extending from this upper surface part. The side parts respectively have a plurality of tapered surfaces inclined more outwardly with distance from the upper surface part.

When the upper surface part is fastened to the terminal main body using the bolt and the nut after the battery post is passed through the electrode fitting portions, the tapered surfaces respectively press side edges of the two fastening portions of the upper part. Components of these pressing forces in a direction parallel to the upper part move the two fastening portions in directions toward each other, deform the electrode fitting portions and reduce them in diameter. The same holds true for the lower part. In this way, the electrode fitting portions are reduced in diameter and come into contact with the battery post so that the battery terminal and the battery post are connected electrically.

However, if the upper part and the lower part are connected as described above, the shape of the terminal main body is complicated. Thus, there are problems of complicating a working process and increasing manufacturing cost.

The present invention was completed based on the above situation and aims to provide a battery terminal capable of simplifying a manufacturing process and reducing cost.

SUMMARY

The present invention is directed to a battery terminal to be mounted on a battery post projecting from a battery main body of a battery, the battery terminal including a terminal main body including an upper plate and a lower plate provided separately from the upper plate and arranged in parallel to the upper plate. The upper plate includes an upper plate mounting portion having an upper plate mounting hole through which the battery post is to be inserted and an upper plate fastening portion connected to the upper plate mounting portion. The upper plate fastening portion includes an upper plate slit extending from an edge of the upper plate mounting hole to an end edge of the upper plate fastening portion. Parts arranged at both sides of the upper plate slit define an upper plate first fastening portion and an upper plate second fastening portion. The lower plate includes a lower plate mounting portion having a lower plate mounting hole through which the battery post is to be inserted and a lower plate fastening portion connected to the lower plate mounting portion. The lower plate fastening portion includes a lower plate slit extending from an edge of the lower plate mounting hole to an end edge of the lower plate fastening portion. Parts arranged at both sides of the lower plate slit define a lower plate first fastening portion and a lower plate second fastening portion. A fastening member is provided and is configured to press the upper plate first fastening portion and the upper plate second fastening portion, and the lower plate first fastening portion and the lower plate second fastening portion in directions toward each other such that the upper plate mounting hole and the lower plate mounting hole are deformed and reduced in diameter by the fastening member being mounted on the terminal main body According to the above configuration, of the upper plate and the lower plate are small and simple as compared to conventional configurations in which an upper part and a lower part are integrated. Thus, it is possible to lower a degree of difficulty in producing each member, simplify a manufacturing process and reduce cost.

The lower plate fastening portion may be arranged to overlap the upper plate fastening portion. If the upper plate fastening portion and the lower plate fastening portion, i.e. parts to be fastened by the fastening member are arranged to overlap each other, a fastening force by the fastening member is easily transferred to both the upper plate mounting portion and the lower plate mounting portion even if the upper plate portion and the lower plate portion are separate bodies. In this way, conduction between the battery terminal and the battery post can be reliably realized.

The upper plate may be arranged to be closer to the tip of the battery post than he lower plate, and a thickness of the upper plate may be larger than that of the lower plate. Here, the battery post preferably is connected conductively to the battery terminal at a position close to the projecting end of the battery post in terms of the structure of the battery post in some cases. In such cases, a contact area of the edge of the upper plate mounting hole with the battery post is increased by making the thickness of the upper plate larger than that of the lower plate. In this way, conduction between the battery terminal and the battery post can be realized reliably.

Alternatively, the lower plate may include an inclination preventing portion extending along the battery post from the edge of the lower plate mounting hole. According to the above configuration, when the terminal main body is going to be inclined with respect to the battery post, the inclination preventing portion comes into contact with the battery post to restrict any further inclination. In this way, the battery terminal is easily mounted in a correct posture on the battery post.

According to the present invention, it is possible to provide a battery terminal capable of simplifying a manufacturing process and reducing cost.

DETAILED DESCRIPTION

Figure 18:
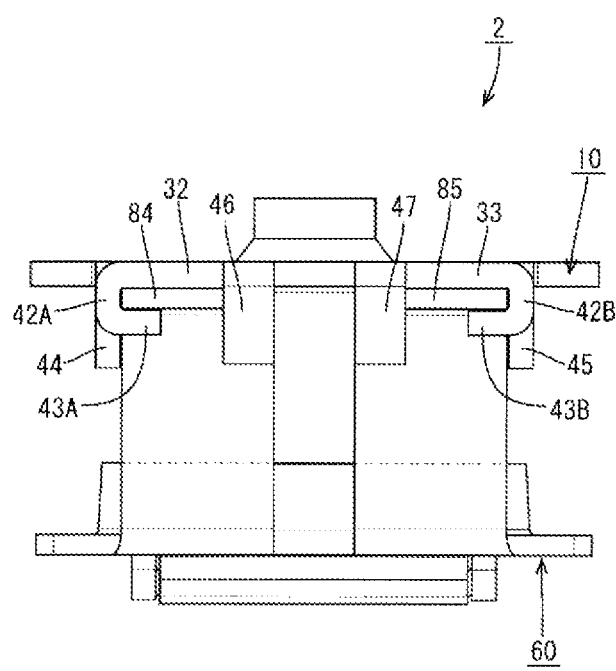
FIG. 18 is a front view of the terminal main body of the embodiment.
Figure 19:
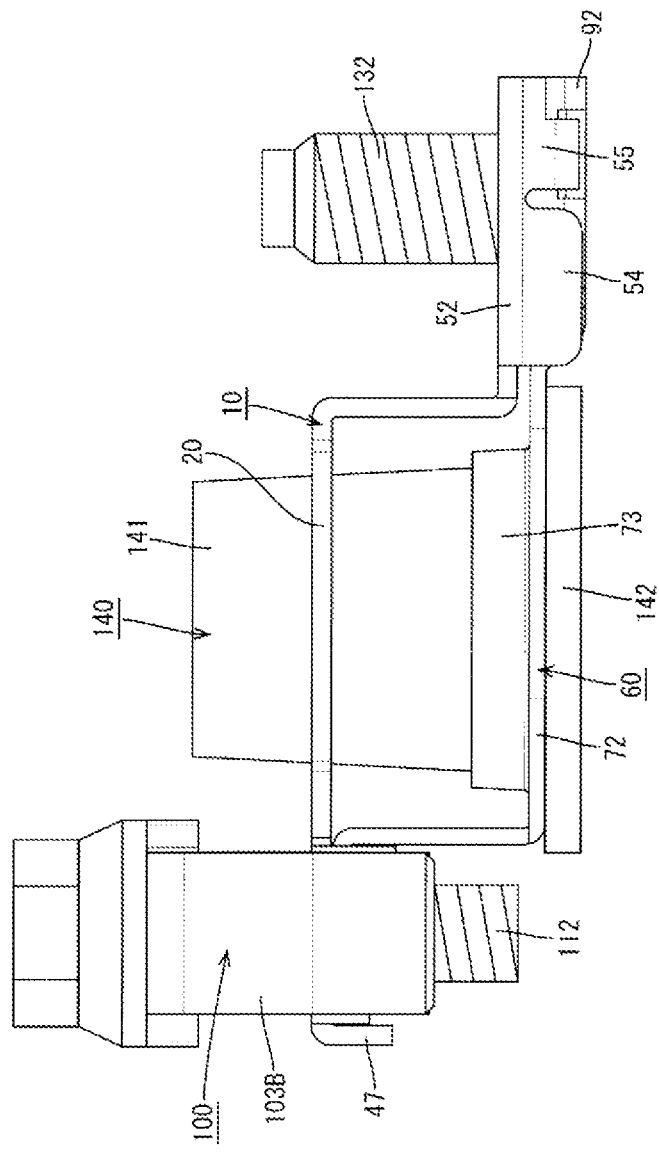
FIG. 19 is a side view showing a state where the battery terminal of the embodiment is mounted on a battery post.
Figure 20:
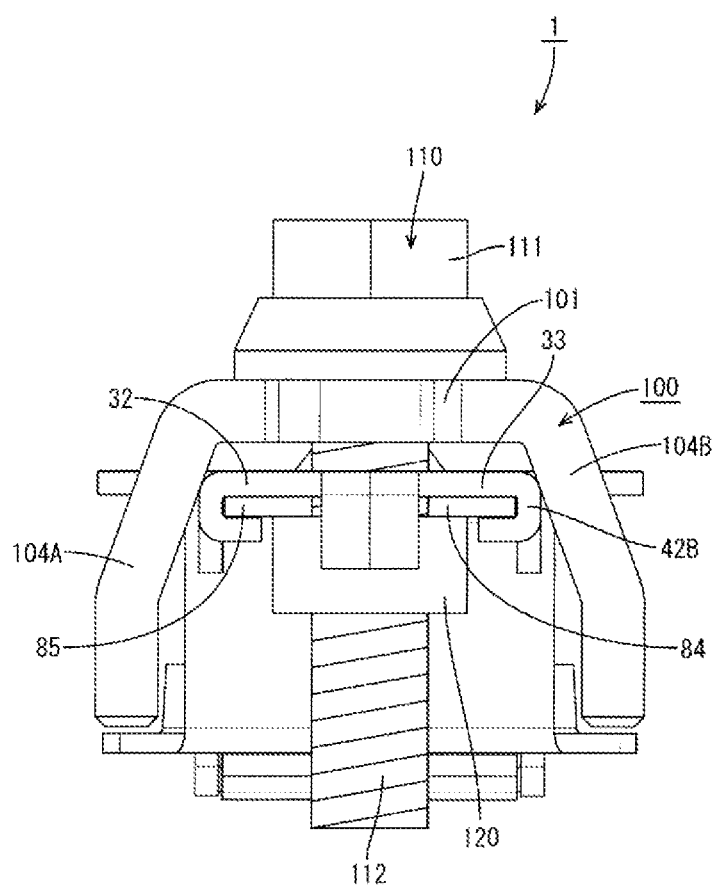
FIG. 20 is a front view showing a state after a fastening bolt is screwed into a nut in the embodiment.

Hereinafter, an embodiment of the present invention is described with reference to FIGS. 1 to 20. A battery terminal 1 of this first embodiment is to be mounted on a battery post 140 provided on a battery (not shown) of a vehicle. As shown in FIG. 19, the battery post 140 includes a seat 142 to be fixed to a battery main body and a cylindrical shaft 141 projecting from the seat 142 toward a side opposite to the battery main body.

Figure 6:
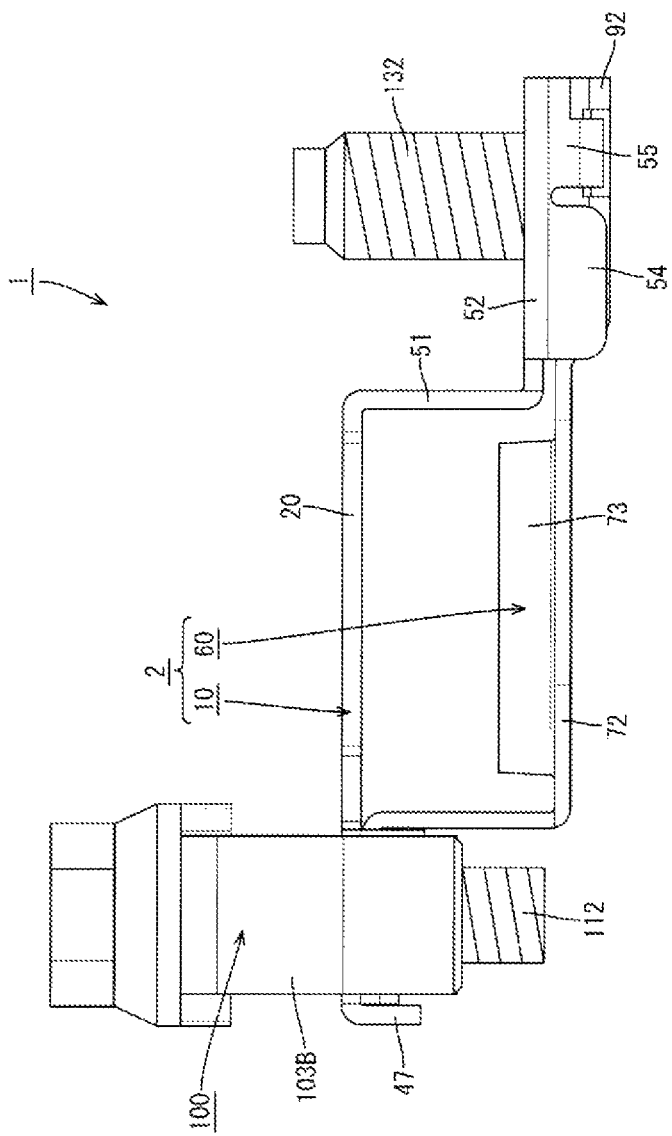
FIG. 6 is a side view of the battery terminal of the embodiment.

As shown in FIG. 6, the battery terminal 1 includes a terminal main body 2 and a bracket 100 (corresponding to a fastening member).

The terminal main body 2 includes an upper plate 10 and a lower plate 60. Each of the upper plate 10 and the lower plate 60 is formed by punching out a metal plate and bending a punched-out metal piece. A plate thickness of the upper plate 10 is larger than that of the lower plate 60.

Figure 7:
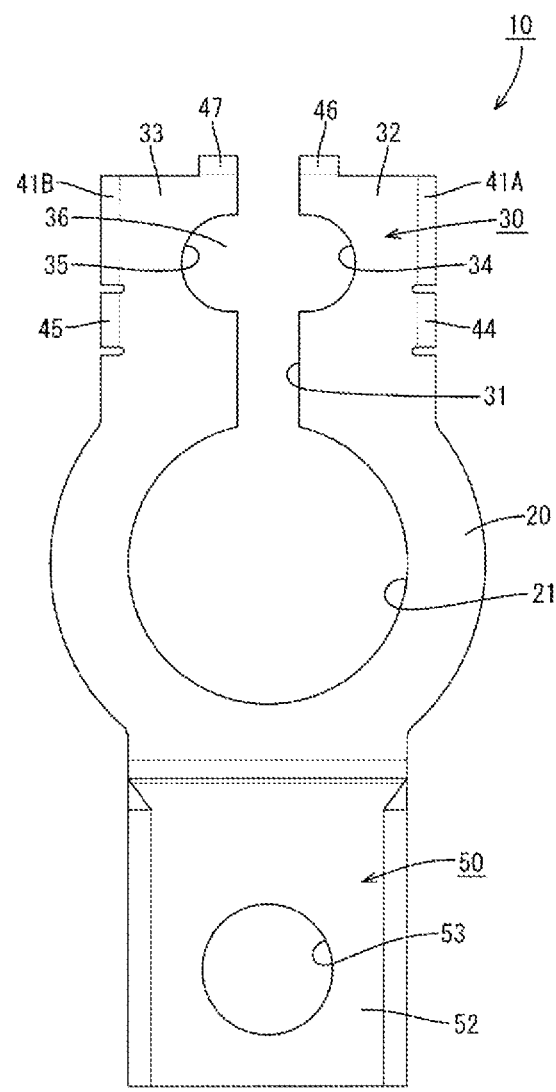
FIG. 7 is a top view of an upper plate portion of the embodiment.

As shown in FIG. 7, the upper plate 10 is a plate-like member long in one direction, and an upper plate fastening portion 30, an upper plate mounting portion 20 and an upper plate connecting portion 50 are arranged to be connected in this order. As shown in FIG. 19, the upper plate 10 is arranged to be perpendicular to an axial direction of the shaft 141 of the battery post 140.

As shown in FIG. 7, the upper plate mounting portion 20 is a circular plate-like part and includes an upper plate mounting hole 21. The upper plate mounting hole 21 penetrates through the upper plate 10 from one surface to the other surface, and the shaft 141 is to be inserted therethrough. The upper plate mounting hole 21 has an inner diameter slightly larger than an outer diameter of the shaft 141 in a free state where the battery terminal 1 is not mounted on the battery post 140.

As shown in FIG. 7, the upper plate fastening portion 30 is a rectangular plate-like part that is connected to the upper plate mounting portion 20 and arranged on the same plane as the upper plate mounting portion 20. The upper plate fastening portion 30 includes an upper plate slit 31, an upper plate first fastening portion 32 and an upper plate second fastening portion 33, a first receiving portion 41A and a second receiving portion 41B, a first guide wall 44 and a second guide wall 45 and a first rotation preventing wall 46 and a second rotation preventing wall 47.

The upper plate slit 31 is a clearance extending from an edge of the upper plate mounting hole 21 to an end edge of the upper plate fastening portion 30 opposite to the upper plate mounting portion 20. By the presence of this upper plate slit 31, the upper plate fastening portion 30 is divided into two parts at a part between the upper plate mounting hole 21 and the above end edge. One of the two parts arranged across the upper plate slit 31 is the upper plate first fastening portion 32 and the other is the upper plate second fastening portion 33.

The upper plate first fastening portion 32 includes a halved recess 34. The halved recess 34 is recessed in a direction away from the upper plate second fastening portion 33 from an end edge facing the upper plate second fastening portion 33. The upper plate second fastening portion 33 also similarly includes a halved recess 35. The halved recess 35 is recessed in a direction away from the upper plate first fastening portion 32 from an end edge facing the upper plate first fastening portion 32. The two halved recesses 34, 35 are arranged to face each other and a space surrounded by the two halved recesses 34, 35 defines an insertion space 36 through which a fastening bolt 110 is to be inserted.

The first receiving portion 41A and the first guide wall 44 are arranged side by side on an outer side edge of the upper plate first fastening portion 32 (side edge on a side opposite to the upper plate second fastening portion 33). The first guide wall 44 is arranged adjacent to the upper plate mounting portion 20 and the first receiving portion 41A is arranged adjacent to the first guide wall 44. The second receiving portion 41B and the second guide wall 45 are arranged side by side on an outer side edge of the upper plate second fastening portion 33 (side edge on a side opposite to the upper plate first fastening portion 32). The second guide wall 45 is arranged adjacent to the upper plate mounting portion 20 and the second receiving portion 41B is arranged adjacent to the second guide wall 45.

Figure 9:
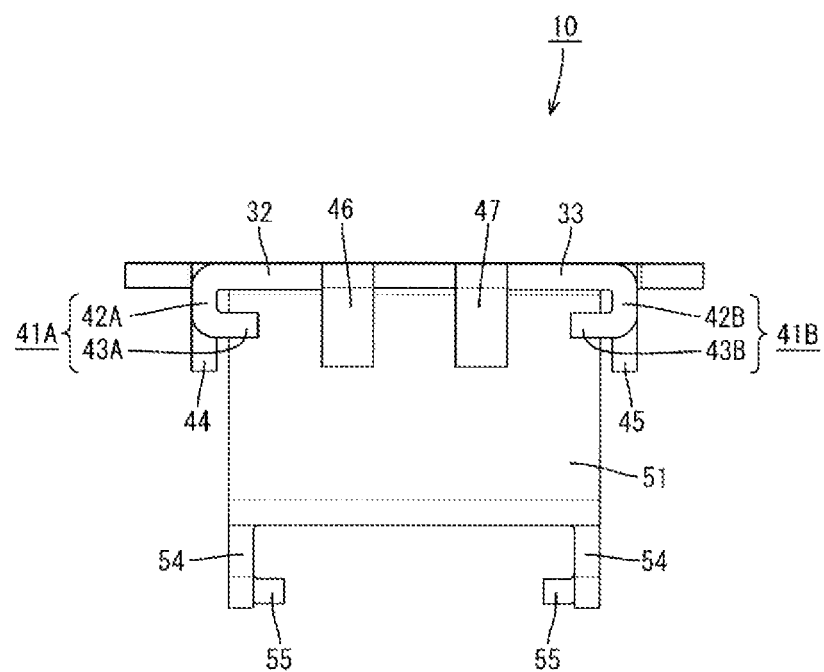
FIG. 9 is a front view of the upper plate portion of the embodiment.

As shown in FIG. 9, the first receiving portion 41A includes a first receiving wall 42A and a first overlapping portion 43A. The first receiving wall 42A extends perpendicular to the upper plate first fastening portion 32 from the outer side edge of the upper plate first fastening portion 32. The first overlapping portion 43A extends inwardly (toward the upper plate second fastening portion 33) from an extending end of the first receiving wall 42A in parallel to the upper plate first fastening portion 32.

The second receiving portion 41B similarly includes a second receiving wall 42B and a second overlapping portion 43B. The second receiving wall 42B extends perpendicular to the upper plate second fastening portion 33 from the outer side edge of the upper plate second fastening portion 33. The second overlapping portion 43B extends inwardly (toward the upper plate first fastening portion 32) from an extending end of the second receiving wall 42B in parallel to the upper plate second fastening portion 33.

As shown in FIG. 9, the first guide wall 44 is a plate-like part extending perpendicular to the upper plate first fastening portion 32 in the same direction as the first receiving wall 42A from the outer side edge of the upper plate first fastening portion 32. The second guide wall 45 is a plate-like part extending perpendicular to the upper plate second fastening portion 33 in the same direction as the second receiving wall 42B from the outer side edge of the upper plate second fastening portion 33.

Figure 11:
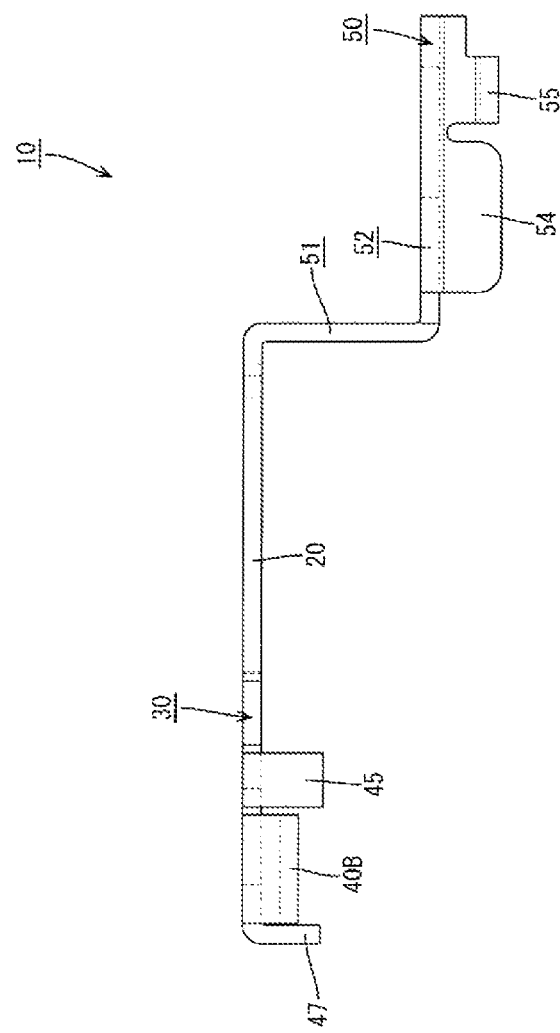
FIG. 11 is a side view of the upper plate portion of the embodiment.

As shown in FIG. 9, the first rotation preventing wall 46 is a plate-like part extending perpendicular to the upper plate first fastening portion 32 in the same direction as the first receiving wall 42A from the end edge of the upper plate first fastening portion 32 opposite to the upper plate mounting portion 20 and arranged in proximity to the upper plate slit 31. As shown in FIGS. 9 and 11, the second rotation preventing wall 47 has the same shape as the first rotation preventing wall 46 and is arranged in proximity to the upper plate slit 31 on the end edge of the upper plate second fastening portion 33 opposite to the upper plate mounting portion 20.

As shown in FIG. 11, the upper plate connecting portion 50 is a substantially L-shaped plate-like part connected to the upper plate mounting portion 20 and arranged on a side opposite to the upper plate fastening portion 30 across the upper plate mounting portion 20. The upper plate connecting portion 50 includes an upper plate coupling portion 51, a bolt covering portion 52, two outer walls 54 and two fixing plates 55.

As shown in FIG. 11, the upper plate coupling portion 51 is a plate-like part connected to the end edge of the upper plate mounting portion 20 opposite to the upper plate fastening portion 30 and extending perpendicular to the upper plate mounting portion 20. The upper plate coupling portion 51 is arranged on the same side as the first and second receiving walls 42A, 42B with respect to the upper plate mounting portion 20. The bolt covering portion 52 is a rectangular plate-like part connected to an end edge of the upper plate coupling portion 51 opposite to the upper plate mounting portion 20 and extending in a direction opposite to an extending direction of the upper plate mounting portion 20 from the upper plate coupling portion 51. The bolt covering portion 52 is arranged in parallel to the upper plate mounting portion 20. As shown in FIG. 7, the bolt covering portion 52 includes a bolt insertion hole 53 through which a terminal connection bolt 130 is to be inserted. The bolt insertion hole 53 penetrates through the bolt covering portion 52 from one surface to the other surface.

Figure 8:
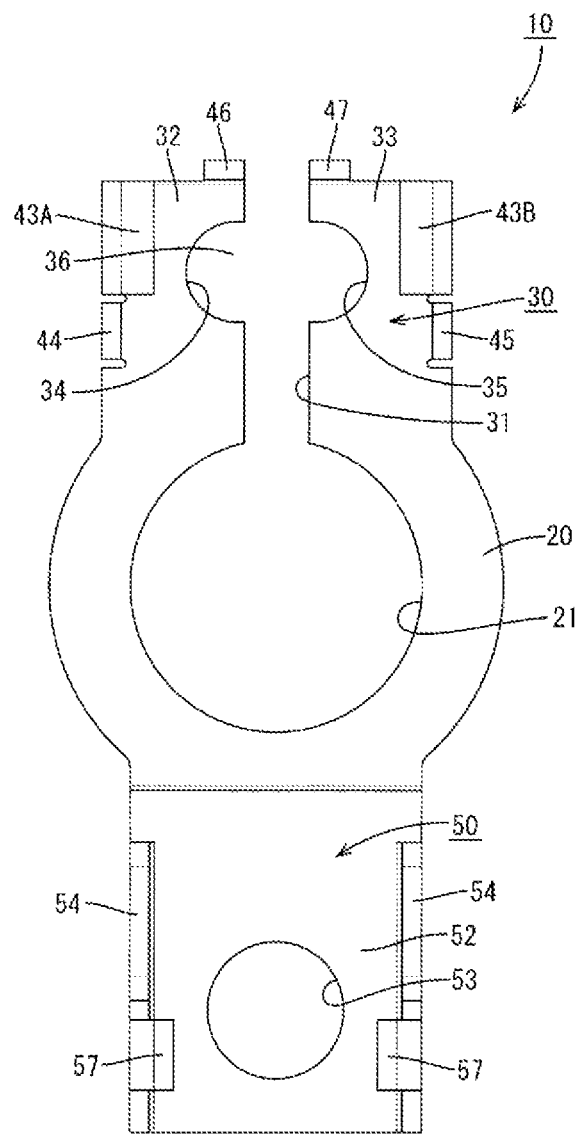
FIG. 8 is a bottom view of the upper plate portion of the embodiment.

As shown in FIG. 8, one outer wall 54 is arranged on each of two side edges (two end edges perpendicular to the end edge connected to the upper plate coupling portion 51) of the bolt covering portion 52. One fixing plate 55 is arranged on each of the two side edges of the bolt covering portion 52. The outer walls 54 are arranged adjacent to the upper plate coupling portion 51 and the fixing plates 55 are arranged adjacent to the outer walls 54.

Figure 10:
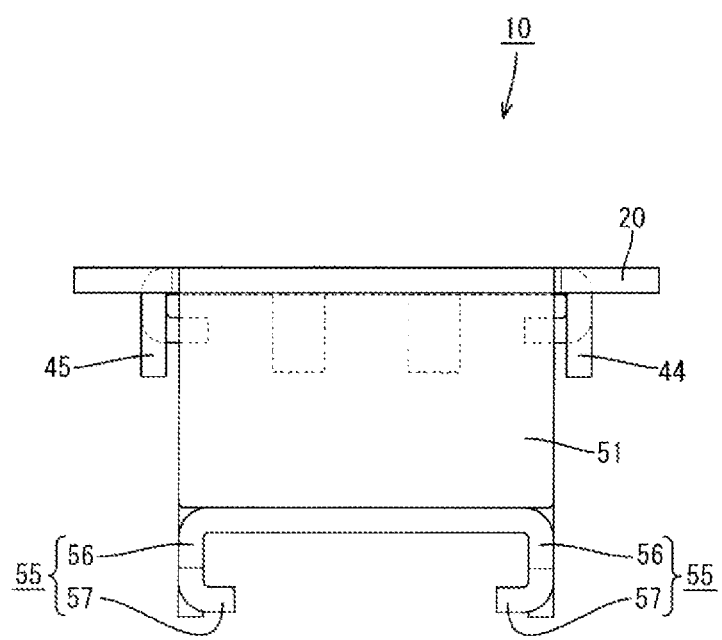
FIG. 10 is a rear view of the upper plate portion of the embodiment.

As shown in FIG. 9, each outer wall 54 extends perpendicular to the bolt covering portion 52 in a direction opposite to an extending direction of the upper plate coupling portion 51 from the bolt covering portion 52 from the side edge of the bolt covering portion 52. As shown in FIG. 10, each fixing plate 55 includes a fixed side plate 56 extending perpendicular to the bolt covering portion 52 in the direction opposite to the extending direction of the upper plate coupling portion 51 from the bolt covering portion 52 from the side edge of the bolt covering portion 52 and a fixing piece 57 extending inwardly (toward the fixing plate 55 on an opposite side) from an extending end of the fixed side plate 56.

Figure 12:
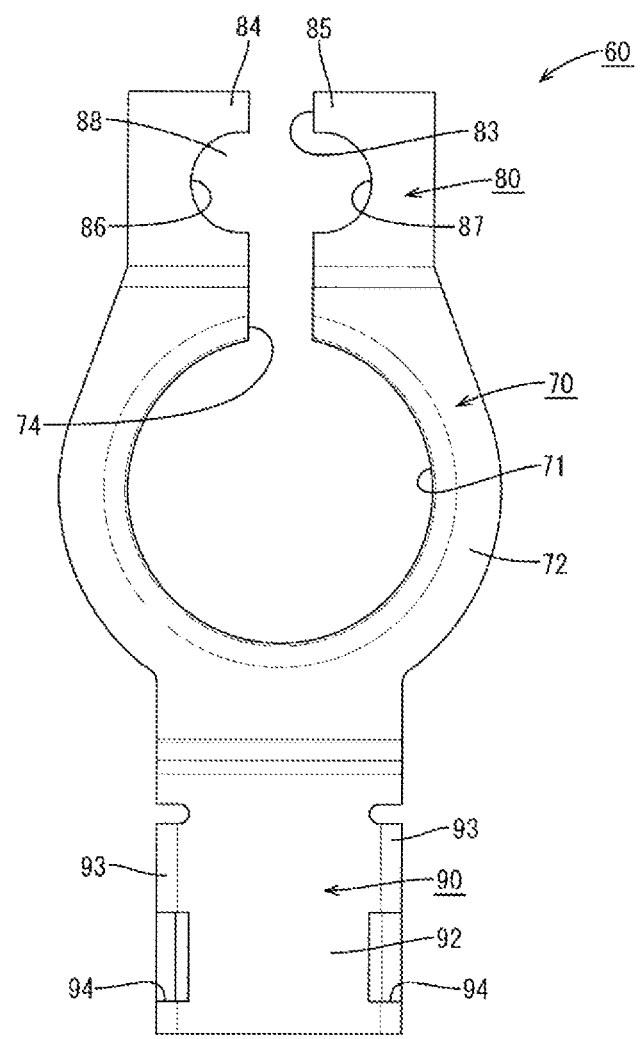
FIG. 12 is a top view of a lower plate portion of the embodiment.

As shown in FIG. 12, the lower plate 60 is a plate-like member long in one direction, and a lower plate fastening portion 80, a lower plate mounting portion 70 and a lower plate connecting portion 90 are arranged to be connected in this order. As shown in FIG. 19, the lower plate 60 is arranged perpendicular to the axial direction of the shaft 141 of the battery post 140 (in parallel to the upper plate 10).

The lower plate mounting portion 70 includes a mounting main body 72 having a lower plate mounting hole 71, and a lower plate mounting tube 73 (corresponding to an inclination preventing portion). The mounting main body 72 is a circular plate-like part. As shown in FIG. 12, the lower plate mounting hole 71 penetrates through the mounting main body 72 from one surface to the other surface, and the shaft 141 is to be inserted therethrough. The lower plate mounting hole 71 has an inner diameter slightly larger than that of the upper plate mounting hole 21 in the free state where the battery terminal 1 is not mounted on the battery post 140.

Figure 16:
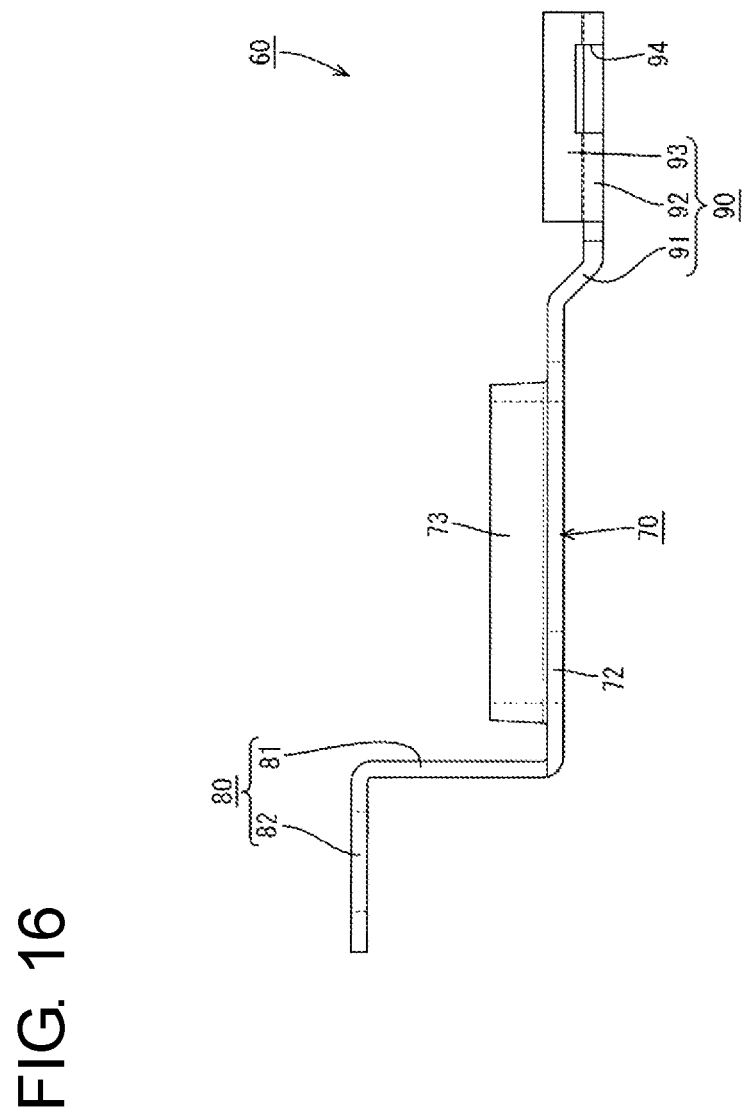
FIG. 16 is a side view of the lower plate portion of the embodiment.

As shown in FIG. 16, the lower plate mounting tube 73 is a tubular part extending perpendicular to the mounting main body 72 from an edge of the lower plate mounting hole 71. As shown in FIG. 12, the lower plate mounting tube 73 includes a lower tube slit 74. The lower tube slit 74 is a clearance extending from an edge of the lower plate mounting tube 73 connected to the mounting main body 72 to an end edge on an opposite side. By the presence of this lower tube slit 74, the lower plate mounting tube 73 is formed into a tube having a C-shaped cross-section and including a cut.

As shown in FIG. 16, the lower plate fastening portion 80 is an L-shaped plate-like part connected to the lower plate mounting portion 70 and includes a lower plate coupling portion 81 and a fastening main body 82. The lower plate coupling portion 81 is a plate-like part connected to the mounting main body 72 and extending perpendicular to the mounting main body 72. The lower plate coupling portion 81 extends toward the same side as the lower plate mounting tube 73 with respect to the mounting main body portion 72. The fastening main body 82 is a plate-like part extending in a direction opposite to an extending direction of the lower plate mounting portion 70 from the lower plate coupling portion 81 from an end edge of the lower plate coupling portion 81 opposite to the lower plate mounting portion 70. The fastening main body 82 is arranged in parallel to the mounting main body 72.

As shown in FIG. 12, the lower plate fastening portion 80 includes a lower plate slit 83. The lower plate slit 83 is a clearance extending from an edge of the lower plate mounting hole 71 to an end edge of the lower plate fastening portion 80 opposite to the lower plate mounting portion 70, and connected to the lower tube slit 74. By the presence of this lower plate slit 83, the lower plate fastening portion 80 is divided into two parts between the lower plate mounting hole 71 and the above end edge.

One of the two parts of the fastening main body 82 arranged across the lower plate slit 83 is a lower plate first fastening portion 84 and the other is a lower plate second fastening portion 85.

The lower plate first fastening portion 84 includes a halved recess 86. The halved recess 86 is recessed in a direction away from the lower plate second fastening portion 85 from an end edge facing the lower plate second fastening portion 85. The lower plate second fastening portion 85 similarly also includes a halved recess 87. The halved recess 87 is recessed in a direction away from the lower plate first fastening portion 84 from an end edge facing the lower plate first fastening portion 84. The two halved recesses 86, 87 are arranged to face each other and a space surrounded by the two halved recesses 86, 87 defines an insertion space 88 through which the fastening bolt 110 is to be inserted.

As shown in FIG. 16, the lower plate connecting portion 90 is a plate-like part connected to the lower plate mounting portion 70 and arranged on a side opposite to the lower plate fastening portion 80 across the lower plate mounting portion 70. The lower plate connecting portion 90 includes an inclined portion 91, a bolt receiving portion 92 and two inner walls 93.

The inclined portion 91 is a plate-like part connected to an end edge of the mounting main body 72 opposite to the lower plate fastening portion 80. The inclined portion 91 is inclined more toward a side opposite to the lower plate mounting tube 73 with distance from the lower plate mounting portion 70.

The bolt receiving portion 92 is a rectangular plate-like portion connected to an end edge of the inclined portion 91 opposite to the lower plate mounting portion 70 and extending in a direction opposite to an extending direction of the lower plate mounting portion 70 from the inclined portion 91. The bolt receiving portion 92 is arranged in parallel to the mounting main body portion 72.

As shown in FIG. 12, each of the two inner walls 93 is arranged on each of two side edges of the bolt receiving portion 92. Each inner wall 93 extends perpendicular to the bolt receiving portion 92 in the same direction as the lower plate mounting tube 73 from the side edge of the bolt receiving portion 92.

Figure 13:
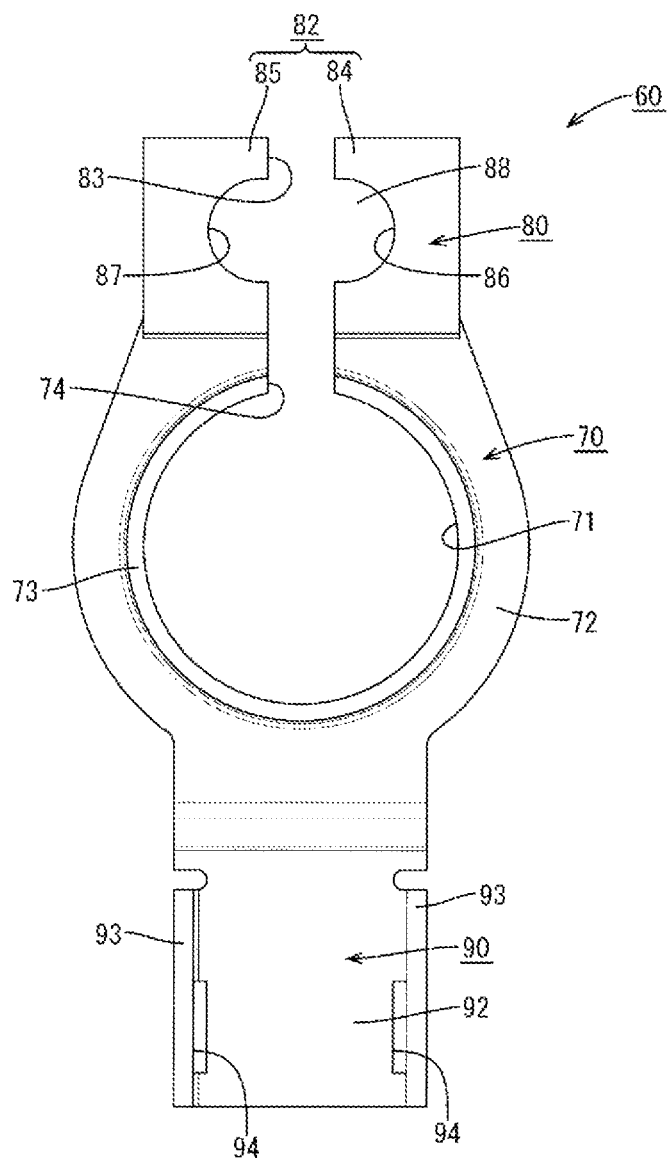
FIG. 13 is a bottom view of the lower plate portion of the embodiment.
Figure 14:
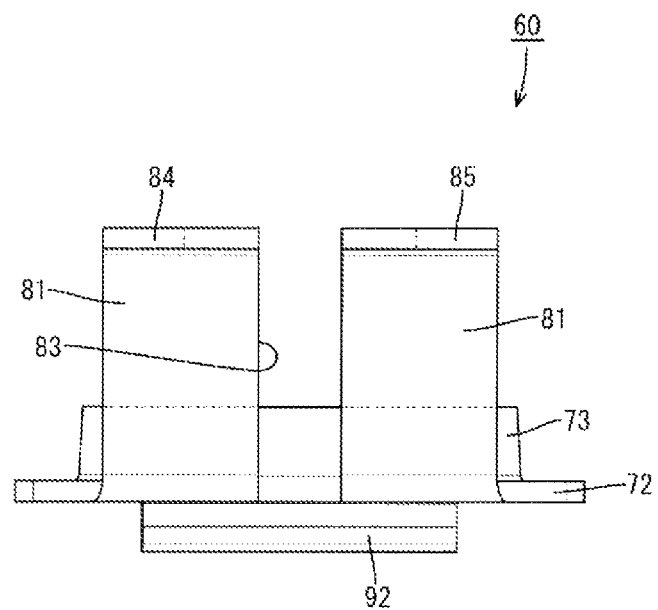
FIG. 14 is a front view of the lower plate portion of the embodiment.
Figure 15:
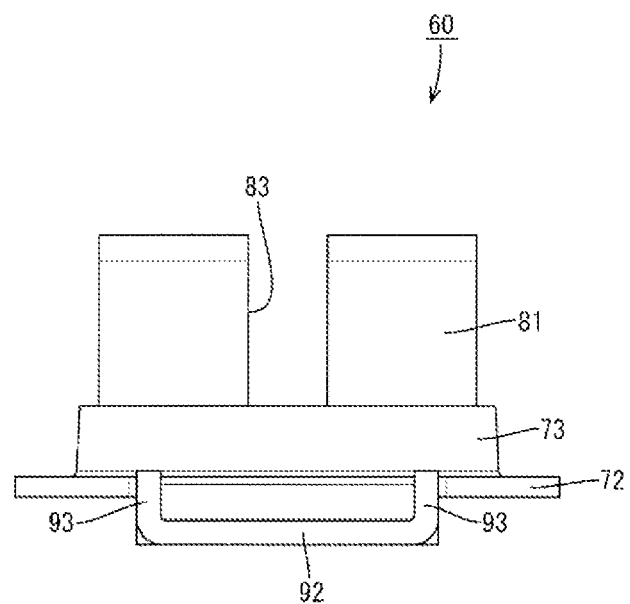
FIG. 15 is a rear view of the lower plate portion of the embodiment.

The lower plate connecting portion 90 includes two fixing receiving holes 94. One of the two fixing receiving holes 94 is arranged on the bolt receiving portion 92 and one of the two inner walls 93 and is shaped by connecting a through hole penetrating through the bolt receiving portion 92 from one surface to the other surface and a through hole penetrating through the inner wall 93 from one surface to the other surface as shown in FIGS. 12 and 13. The other fixing receiving hole 94 is arranged on the bolt receiving portion 92 and the other of the two inner walls 93 and has the same shape as the one fixing receiving hole 94.

Figure 5:
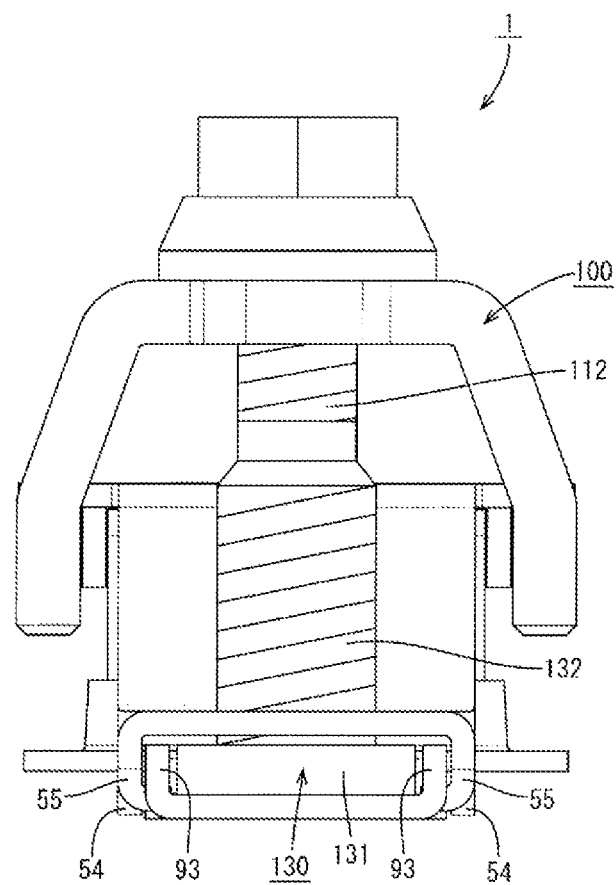
FIG. 5 is a rear view of the battery terminal of the embodiment.

A distance between outer side surfaces (surfaces opposite to the mating inner wall portions 93) of the two inner walls 93 is shorter than a distance between inner side surfaces of the two outer walls 54 of the upper plate 10 (surfaces facing the mating outer walls 54), as shown in FIG. 5.

Figure 17:
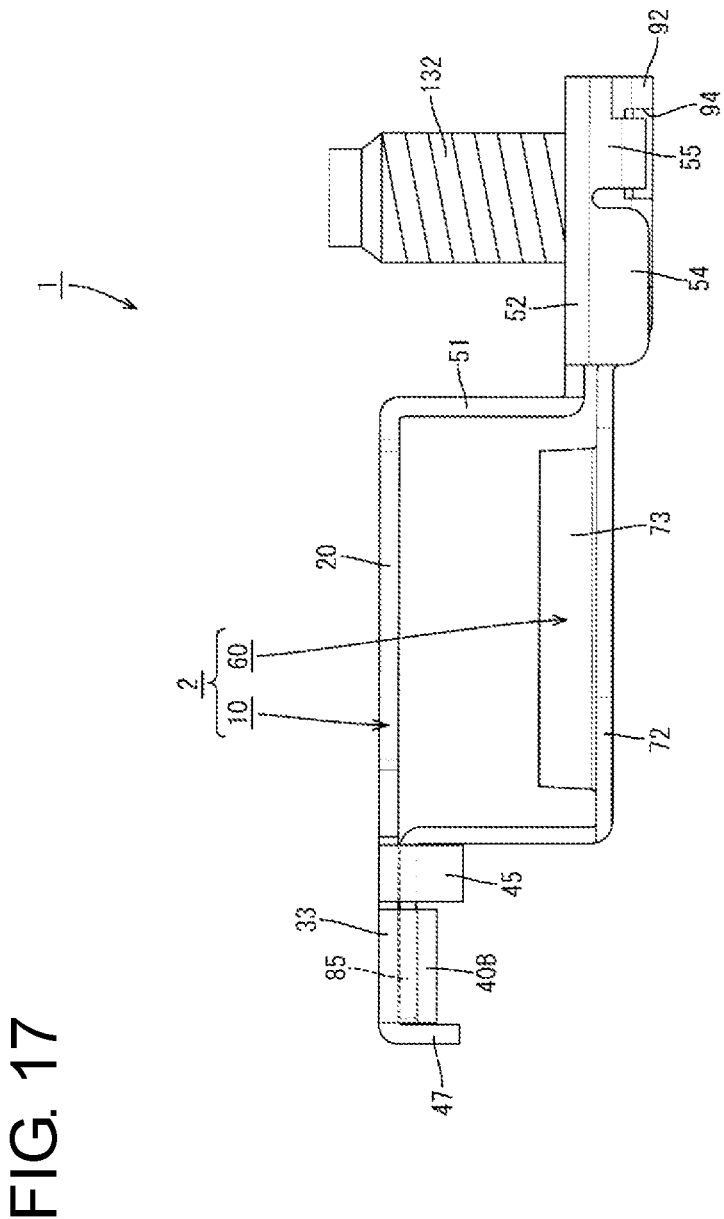
FIG. 17 is a side view of a terminal main body of the embodiment.

As shown in FIG. 17, the upper plate 10 and the lower plate 60 are placed one over the other and assembled with the lower plate mounting tube 73 facing the upper plate 10. When assembled, the lower plate first fastening portion 84 is sandwiched between the upper plate first fastening portion 32 and the first overlapping portion 43A and surrounded by the first receiving wall 42A, the first guide wall 44 and the first rotation preventing wall 46, as shown in FIG. 18. Further, the lower plate second fastening portion 85 is sandwiched between the upper plate second fastening portion 33 and the second overlapping portion 43B and surrounded by the second receiving wall 42B, the second guide wall 45 and the second rotation preventing wall 47. That is, the upper plate first fastening portion 32 and the lower plate first fastening portion 84 are arranged in close contact and the upper plate second fastening portion 33 and the lower plate second fastening portion 84 are arranged in close contact.

As shown in FIG. 17, the upper plate mounting portion 20 and the lower plate mounting portion 70 are arranged in parallel to each other while being spaced apart and the lower plate mounting tube 73 is facing the upper plate mounting portion 20. Further, as shown in FIG. 5, the bolt covering portion 52 and the bolt receiving portion 92 are placed one over the other such that the outer walls 54 and the inner walls 93 extend toward the mating sides, and each inner wall 93 is arranged inside each outer wall 54. The fixing pieces 57 are accommodated in the fixing receiving holes 94.

The terminal connection bolt 130 is held by the bolt covering portion 52 and the bolt receiving portion 92. As shown in FIG. 5, the terminal connection bolt 130 includes a head 131 and a trunk 132. A clearance corresponding to a length of the inner walls 93 is present between the bolt covering portion 52 and the bolt receiving portion 92, and the head 131 of the terminal connection bolt 130 is accommodated in this clearance. The trunk 132 of the terminal connection bolt 130 projects outwardly through the bolt insertion hole 53. A wire can be connected to the terminal connection bolt 130 via a wire-side terminal The upper plate mounting hole 21 and the lower plate mounting hole 71 are arranged to overlap each other, the upper plate slit 31 and the lower plate slit 83 are arranged to overlap each other and the halved recesses 34, 35 of the upper plate 10 and the halved recesses 86, 87 of the lower plate 60 are arranged to overlap each other when viewed in a direction perpendicular the plate surfaces of the upper plate 10 and the lower plate 60.

Figure 3:
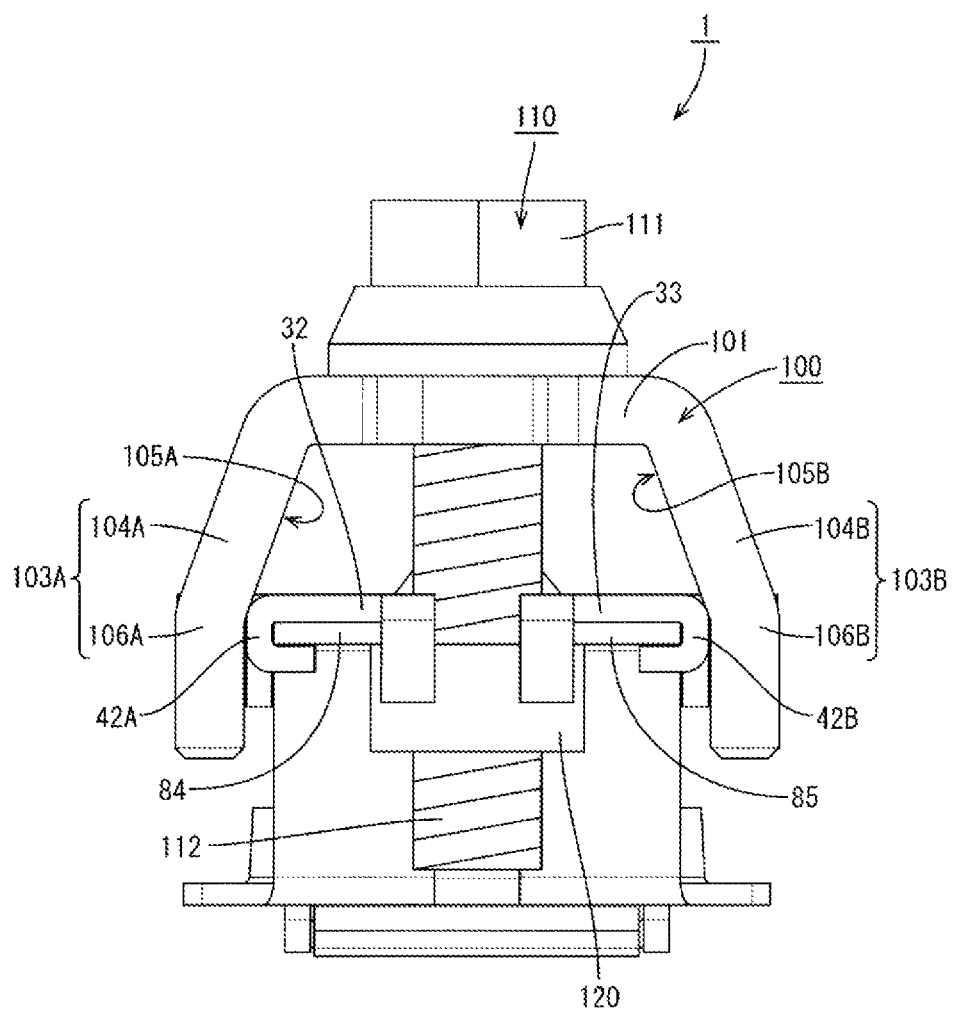
FIG. 3 is a front view of the battery terminal of the embodiment.

The bracket 100 is to be mounted on the terminal main body 2 by the fastening bolt 110 and a nut 120 to deform the terminal main body 2 such that the upper plate mounting hole 21 and the lower plate mounting hole 71 are reduced in diameter. As shown in FIG. 3, the bracket 100 includes a base 101 and two pressing portions 103A, 103B.

Figure 4:
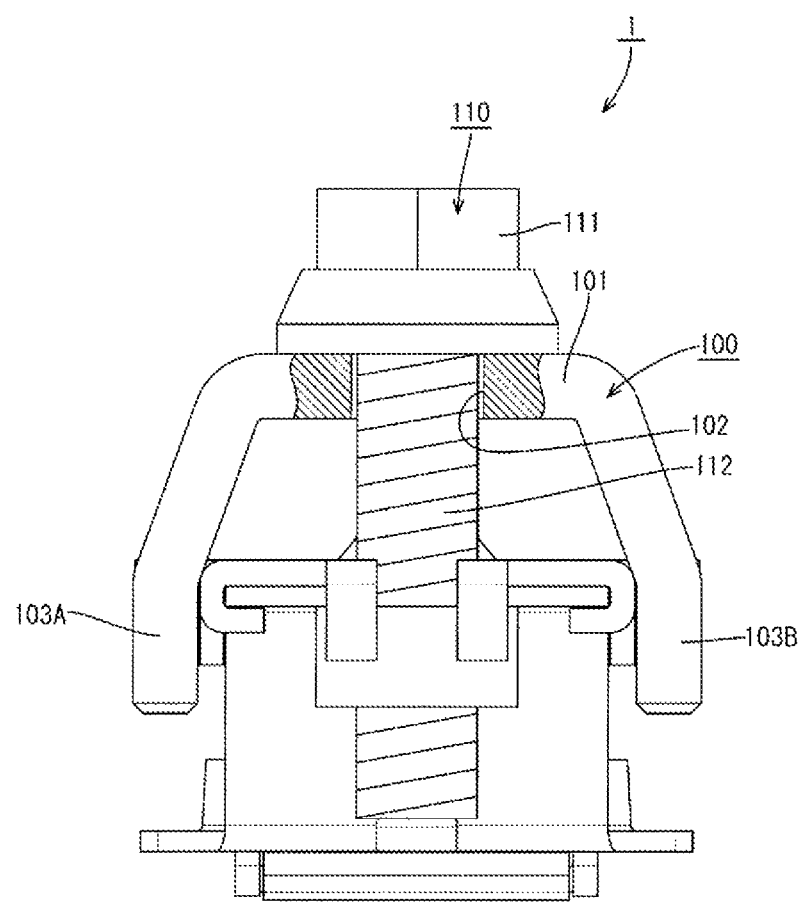
FIG. 4 is a view partly in section of the battery terminal of the embodiment.

The base 101 is a rectangular plate-like part to be arranged at a side opposite to the lower plate 60 across the upper plate first fastening portion 32 and the upper plate second fastening portion 33. In the base 101, a distance between two sides parallel to the upper plate slit 31 is shorter than a distance between an outer end edge of the upper plate first fastening portion 32 and that of the upper plate second fastening portion 33. As shown in FIG. 4, the base 101 includes a bolt insertion hole 102 penetrating from a surface facing the upper plate 10 to its opposite surface.

One of the two pressing portions 103A, 103B is a first pressing portion 103A and the other is a second pressing portion 103B. The first pressing portion 103A is a plate-like part extending toward the terminal main body 2 from the side closer to the upper plate first fastening portion 32 out of the two sides of the base 101 parallel to the upper plate slit 31. The second pressing portion 103B is a plate-like part extending toward the terminal main body 2 from the side closer to the upper plate second fastening portion 33 out of the two sides of the base 101 parallel to the upper plate slit 31.

The first pressing portion 103A includes a first tapered portion 104A connected to the base 101 and inclined in a direction to be more separated from the second pressing portion 103B with distance from the base 101 and a first perpendicular portion 106A connected to an end edge of the first tapered portion 104A opposite to the base 101 and extending perpendicular the base 101. The second pressing portion 103B also similarly includes a second tapered portion 104B and a second perpendicular portion 106B. Surfaces of the first and second tapered portions 104A, 104B facing each other are respectively a first tapered surface 105A and a second tapered surface 105B inclined in directions to be more separated from the mating sides with distance from the base 101. The first and second pressing portions 103A, 103B respectively bring the first and second tapered surfaces 105A, 105B into contact with the first and second receiving walls 42A, 42B, so that the first and second receiving walls 42A, 42B are pressed toward each other.

As shown in FIGS. 3 and 4, the fastening bolt 110 has a head 111 and a trunk 112 having an external thread formed on the outer peripheral surface.

Figure 1:
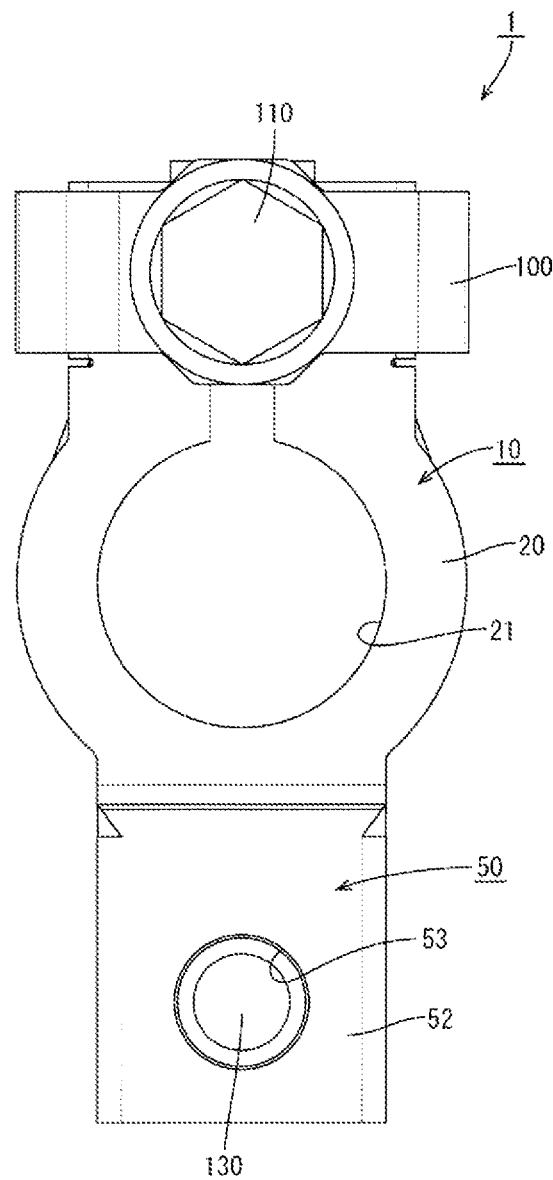
FIG. 1 is a top view of a battery terminal of an embodiment.
Figure 2:
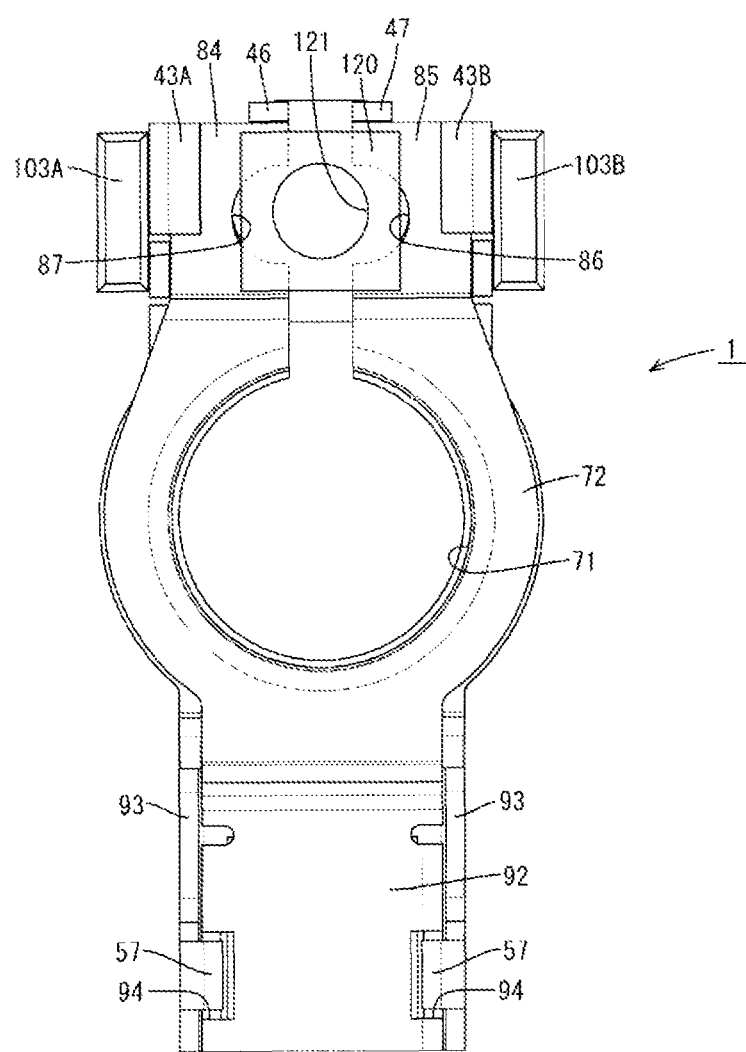
FIG. 2 is a bottom view of the battery terminal of the embodiment.

As shown in FIG. 2, the nut 120 is a square nut having a rectangular block shape and including a nut hole 121. The nut hole 121 penetrates from one surface to an opposite surface of the nut 120 and has a screw groove on the inner peripheral surface. The nut 120 is placed on surfaces of the lower plate first fastening portion 84 and the lower plate second fastening portion 85 opposite to the upper plate first fastening portion 32 and the upper plate second fastening portion 33, as shown in FIG. 3.

Next, the procedure of mounting the battery terminal 1 configured as described above on the battery post 140 is described.

First, the upper plate 10 and the lower plate 60 are assembled to assemble the terminal main body 2 (see FIG. 17). Subsequently, the bracket 100 is placed on the terminal main body 2. The fastening bolt 110 then is inserted through the bolt insertion hole 102 and the insertion spaces 36, 88 from the side of the bracket 100 and the tip of the trunk 112 is caused to project from the lower plate fastening portion 80. Then, the nut 120 is screwed onto the tip of the trunk 112. In this state, the first pressing portion 103A is in contact with the first receiving wall 42A, the second pressing portion 103B is in contact with the second receiving wall 42B and the base 101 is lifted up from the upper plate first fastening portion 32 and the upper plate second fastening portion 33 (see FIG. 3).

Subsequently, the shaft 141 of the battery post 140 is inserted through the upper plate mounting hole 21 and the lower plate mounting hole 71 (see FIG. 19). At this time, the lower plate 60 is arranged on the side of the seat 142 and the upper plate 10 is arranged on a tip side of the shaft 141.

In this state, the fastening bolt 110 is screwed into the nut 120. At this time, if the nut 120 is going to rotate according to the rotation of the fastening bolt 110, a side surface of the nut 120 comes into contact with the first or second rotation preventing wall 46, 47 to suppress any further rotation of the nut 120. In this way, the rotation of the nut 120 according to the rotation of the fastening bolt 110 can be suppressed (see FIG. 2).

As the fastening bolt 110 is screwed into the nut 120, the base 101 is pressed by the head 111 of the fastening bolt 110 to move toward the upper plate first fastening portion 32 and the upper plate second fastening portion 33. Then, the first and second receiving walls 42A, 42B move in directions toward the base 101 (i.e. in directions to a narrow a spacing between the first and second tapered portions 104A, 10B) while respectively sliding in contact with the first and second tapered portions 104A, 104B. In this way, the first and second receiving walls 42A, 42B move in directions toward each other (see FIG. 20).

A component of a pressing force to the first receiving wall 42A by the first tapered portion 104A in parallel to the upper plate 10 and the lower plate 60 is transferred to the upper plate first fastening portion 32 and the lower plate first fastening portion 84. Thus, the upper plate first fastening portion 32 and the lower plate first fastening portion 84 move in directions toward the upper plate second fastening portion 33 and the lower plate second fastening portion 85. Similarly, the upper plate second fastening portion 33 and the lower plate second fastening portion 85 also move in directions toward the upper plate first fastening portion 32 and the lower plate first fastening portion 84.

In this way, the upper plate mounting hole 21 is reduced in diameter and the inner peripheral surface thereof comes into close contact with the outer peripheral surface of the shaft 141 of the battery post 140. In this way, conduction between the battery post 140 and the battery terminal 1 is realized.

Further, the lower plate mounting hole 71 and the lower plate mounting tube portion 73 are also reduced in diameter and arranged such that the inner peripheral surface of the lower plate mounting tube 73 extends along the outer peripheral surface of the shaft 141. This causes the inner peripheral surface of the lower plate mounting tube 73 to come into contact with the outer peripheral surface of the shaft 141 to restrict any further inclination of the terminal main body 2 when the terminal main body 2 is going to be inclined with respect to the battery post 140.

As described above, according to this embodiment, the upper plate 10 and the lower plate 60 are separate members in the terminal main body 2 of the battery terminal 1. According to this configuration, each of the upper plate 10 and the lower plate 60 is small and simple as compared to the conventional battery terminal in which the upper part and the lower part are integrated. Thus, it is possible to lower a degree of difficulty in producing each member, simplify a manufacturing process and reduce cost.

Particularly, the conventional battery terminal in which the upper and lower parts are integrated has to be bent such that centers of the electrode fitting portion of the upper part and that of the lower part match. Therefore, a degree of difficulty of processing is high. As compared to this, in the case of assembling and using the separately formed upper plate 10 and the lower plate 60, an assembling tolerance is set in advance (i.e. a slight positional displacement is allowed during assembling) and the positions of the upper plate 10 and the lower plate 60 are corrected automatically by the edges of the upper plate mounting hole 21 and the lower plate mounting hole 71 extending along the outer peripheral surface of the battery post 140 during the mounting onto the battery post 140 (self-alignment). Thus, the battery terminal 1 of this embodiment does not require as high processing accuracy as the conventional battery terminal and the process can be simplified.

Further, the upper plate first fastening portion 32 and the lower plate first fastening portion 84 are arranged to overlap each other and the upper plate second fastening portion 33 and the lower plate second fastening portion 85 are arranged to overlap each other. That is, since parts to be fastened by the bracket 100 are arranged to overlap each other, a fastening force by the bracket 100 is easily transferred to both the upper plate mounting portion 20 and the lower plate mounting portion 60 even if the upper plate 10 and the lower plate 60 are separate bodies. In this way, conduction between the battery terminal 1 and the battery post 140 can be reliably realized.

In addition, if the upper plate 10 and the lower plate 60 are separate bodies, roles can be shared by the two members and a plate thickness, a material, a shape and the like can be changed according to the roles of each member. In this way, a degree of freedom in designing is improved. Further, the shape of each member can be simplified and a further cost reduction can be realized.

Specifically, the upper plate 10 is a member arranged closer to the projecting end of the battery post 140 than the lower plate 60 and the thickness of the upper plate 10 is larger than that of the lower plate 60.

Further, the lower plate 60 includes the lower plate mounting tube 73 extending along the battery post 140 from the hole edge of the lower plate mounting hole 71.

Here, the battery post 140 is preferably conductively connected to the battery terminal 1 at a position close to the projecting end of the battery post 140 in terms of the structure of the battery post 140. The battery terminal 1 of this embodiment is compatible with such a case and a role of conduction with the battery post 140 is given to the upper plate 10 and a role of preventing the inclination of the terminal main body 2 is given to the lower plate 60.

That is, a contact area of the edge of the upper plate mounting hole 21 with the battery post 140 is increased by making the thickness of the upper plate 10 larger than that of the lower plate 60. In this way, conduction between the battery terminal 1 and the battery post 140 can be reliably realized.

Further, since the lower plate 60 includes the lower plate mounting tube 73, the lower plate mounting tube 73 comes into contact with the battery post 140 to restrict any further inclination if the terminal main body 2 is going to be inclined with respect to the battery post 140. In this way, the battery terminal 1 can be easily mounted in a correct posture on the battery post 140.

The present invention is not limited to the above described and illustrated embodiment. For example, the following embodiments are also included in the technical scope of the present invention.

Although the thickness of the upper plate 10 is larger than that of the lower plate 60 in the above embodiment, the upper plate and the lower plate may have the same thickness.

Although the lower plate mounting tube 73 is arranged only in the lower plate mounting portion 70 in the above embodiment, the mounting tube may be arranged in both the lower plate mounting portion and the upper plate mounting portion.

LIST OF REFERENCE SIGNS

1 . . . battery terminal
2 . . . terminal main body
10 . . . upper plate
21 . . . upper plate mounting hole
20 . . . upper plate mounting portion
30 . . . upper plate fastening portion
31 . . . upper plate slit
32 . . . upper plate first fastening portion
33 . . . upper plate second fastening portion
60 . . . lower plate
71 . . . lower plate mounting hole
70 . . . lower plate mounting portion
80 . . . lower plate fastening portion
83 . . . lower plate slit
84 . . . lower plate first fastening portion
85 . . . lower plate second fastening portion
73 . . . lower plate mounting tube (inclination preventing portion)
100 . . . bracket (fastening member)
140 . . . battery post

The invention claimed is:

1. A battery terminal to be mounted on a battery post projecting from a battery main body of a battery, comprising:
a terminal main body including an upper plate and a lower plate provided separately from the upper plate and arranged in parallel to the upper plate, the upper plate including an upper plate mounting portion having an upper plate mounting hole through which the battery post is to be inserted and an upper plate fastening portion connected to the upper plate mounting portion, the upper plate fastening portion including an upper plate slit extending from an edge of the upper plate mounting hole to an end edge of the upper plate fastening portion, and parts arranged at both sides of the upper plate slit defining an upper plate first fastening portion and an upper plate second fastening portion, and the lower plate including a lower plate mounting portion having a lower plate mounting hole through which the battery post is to be inserted and a lower plate fastening portion connected to the lower plate mounting portion, the lower plate fastening portion including a lower plate slit extending from an edge of the lower plate mounting hole to an end edge of the lower plate fastening portion, and parts arranged at both sides of the lower plate slit defining a lower plate first fastening portion and a lower plate second fastening portion; and
a fastening member configured to press the upper plate first fastening portion and the upper plate second fastening portion, and the lower plate first fastening portion and the lower plate second fastening portion in directions toward each other such that the upper plate mounting hole and the lower plate mounting hole are deformed and reduced in diameter by the fastening member being mounted on the terminal main body.

2. The battery terminal of claim 1, wherein the lower plate fastening portion is arranged to overlap the upper plate fastening portion.

3. The battery terminal of claim 2, wherein:
the upper plate is arranged to be closer to the tip of the battery post than the lower plate; and
a thickness of the upper plate is larger than that of the lower plate.

4. The battery terminal of claim 3, wherein the lower plate includes an inclination preventing portion extending along the battery post from the edge of the lower plate mounting hole.

5. The battery terminal of claim 1, wherein:
the upper plate is arranged to be closer to the tip of the battery post than the lower plate; and
a thickness of the upper plate is larger than that of the lower plate.

6. The battery terminal of claim 1, wherein the lower plate includes an inclination preventing portion extending along the battery post from the edge of the lower plate mounting hole.

* * * * *